(12) United States Patent
Kozawa et al.

(10) Patent No.: US 8,770,499 B2
(45) Date of Patent: Jul. 8, 2014

(54) METHOD FOR MANUFACTURING POWDER

(75) Inventors: Kazumi Kozawa, Fujimino (JP); Kosuke Ando, Fujimi (JP); Daisuke Sato, Yoshimi-town (JP)

(73) Assignee: Nisshin Seifun Group Inc., Tokyo (JP)

( * ) Notice: Subject to any disclaimer, the term of this patent is extended or adjusted under 35 U.S.C. 154(b) by 0 days.

(21) Appl. No.: 14/003,609

(22) PCT Filed: Feb. 24, 2012

(86) PCT No.: PCT/JP2012/054557
§ 371 (c)(1),
(2), (4) Date: Sep. 6, 2013

(87) PCT Pub. No.: WO2012/124452
PCT Pub. Date: Sep. 20, 2012

(65) Prior Publication Data
US 2013/0334345 A1 Dec. 19, 2013

(30) Foreign Application Priority Data
Mar. 16, 2011 (JP) ................................ 2011-058273

(51) Int. Cl.
*B02C 19/06* (2006.01)
*B02C 23/06* (2006.01)
*B02C 21/00* (2006.01)

(52) U.S. Cl.
USPC .................... 241/5; 241/21; 241/16

(58) Field of Classification Search
USPC ........................... 241/5, 16, 39, 21
See application file for complete search history.

(56) References Cited

U.S. PATENT DOCUMENTS 6,824,086 B1 * 11/2004 Mazurkiewicz et al. ......... 241/5

FOREIGN PATENT DOCUMENTS

| JP | A-63-151367 | 6/1988 |
| JP | A-05-330819 | 12/1993 |
| JP | A-08-119693 | 5/1996 |
| JP | A-11-179228 | 7/1999 |
| JP | A-2000-42441 | 2/2000 |
| JP | A-2000-247751 | 9/2000 |
| JP | A-2007-196147 | 8/2007 |

OTHER PUBLICATIONS

Sep. 17, 2013 International Preliminary Report on Patentability issued in PCT/JP2012/054557, w/translation.
International Search Report issued in International Patent Application No. PCT/JP2012/054557 mailed Apr. 17, 2012.

* cited by examiner

*Primary Examiner* — Faye Francis
(74) *Attorney, Agent, or Firm* — Oliff PLC

(57) ABSTRACT

A method for manufacturing a powder includes a mixing step in which a powder and a liquid additive are mixed together, a drying step in which the powder mixed in the mixing step is dried, a loading step in which the powder dried in the drying step is loaded into a pulverizer, a heating step in which a high-pressure gas is heated, a supplying step in which the high-pressure gas heated in the heating step is supplied to the pulverizer, and a pulverizing step in which the powder is pulverized by the pulverizer.

16 Claims, 4 Drawing Sheets

METHOD FOR MANUFACTURING POWDER

TECHNICAL FIELD

The present invention relates to a method for manufacturing a powder using a pulverizing apparatus which pulverizes a powder by a swirling air stream produced in a pulverizing chamber.

BACKGROUND ART

As before, there exists such a pulverizing apparatus in which an ejection nozzle is arranged in a side wall of a pulverizing chamber so as to incline against the center portion of the pulverizing chamber, and a compressed air is ejected from the ejection nozzle to produce a swirling air stream in the pulverizing chamber. The swirling air stream pulverizes a powder loaded in the pulverizing chamber (see Patent Literatures 1 to 3).

CITATION LIST

Patent Literature

Patent Literature 1: JP 2000-42441 A
Patent Literature 2: JP 2007-196147 A
Patent Literature 3: JP H11-179228 A

SUMMARY OF INVENTION

Technical Problem

In a pulverizing apparatus described above, in a case of pulverizing a powder having high adhesiveness, there occurred such a problem that a powder sticks and accumulates in the apparatus to cause a blockage inside the apparatus, or an accumulation flakes off and an aggregation of the powder is ejected from the apparatus.

An object of the present invention is to provide a method for manufacturing a powder in which a powder can be more finely pulverized and at the same time continuously pulverized.

Solution to Problem

A method for manufacturing a powder of the present invention is characterized by including: a mixing step in which a powder and a liquid additive are mixed together; a drying step in which the powder mixed in the mixing step is dried; a loading step in which the powder dried in the drying step is loaded into a pulverizer; a heating step in which a high-pressure gas is heated; a supplying step in which the high-pressure gas heated in the heating step is supplied to the pulverizer; and a pulverizing step in which the powder is pulverized by the pulverizer.

Further, a method for manufacturing a powder of the present invention is characterized by including: a mixing step in which a powder and a liquid additive are mixed together; a drying step in which the powder mixed in the mixing step is dried; a loading step in which the powder dried in the drying step is loaded into a pulverizer; a supplying step in which a high-pressure gas is supplied to the pulverizer; and a pulverizing step in which the powder is pulverized by the pulverizer.

Further, the method for manufacturing a powder of the present invention is characterized in that the liquid additive is diethylene glycol monomethyl ether.

Further, the method for manufacturing a powder of the present invention is characterized in that the powder is a powder including barium titanate.

Further, the method for manufacturing a powder of the present invention is characterized in that a drying temperature and a period of time for drying in the drying step correspond to a flash point of the liquid additive.

Advantageous Effects of Invention

According to the present invention, a powder can be more finely pulverized and at the same time continuously pulverized.

DESCRIPTION OF EMBODIMENTS

Figure 1:
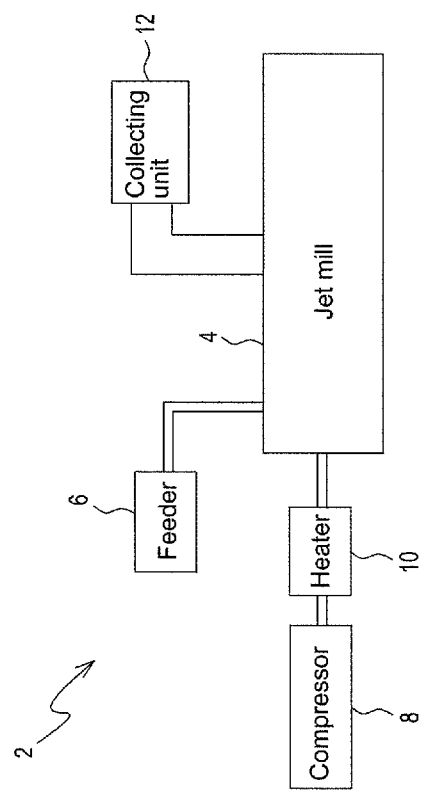
FIG. 1 illustrates a configuration of a pulverizing apparatus according to an embodiment of the present invention.

A method for manufacturing a powder according an embodiment of the present invention will be described below referring to the drawings. FIG. 1 illustrates a configuration of a pulverizing apparatus used in a method for manufacturing a powder according to an embodiment.

As shown in FIG. 1, the pulverizing apparatus 2 includes a jet mill (pulverizer) 4 which pulverizes a loaded powder by a swirling air stream produced inside a pulverizing chamber 20 (see FIG. 2), a feeder 6 which loads the powder into the jet mill 4, a compressor 8 which supplies a high-pressure gas to the jet mill 4, a heater 10 which heats the supplied high-pressure gas to a given temperature, and a collecting unit 12 which collects the powder discharged from the jet mill 4.

The feeder 6 includes a screw therein, which is not shown in the drawing, and a powder contained in the feeder 6 is transmitted at a constant flow rate by rotating the screw. The transmitted powder is loaded into a funnel 36 (see FIG. 2) provided on a top surface of the jet mill 4 and supplied to the pulverizing chamber 20 of the jet mill 4. The powder contained in the feeder 6 is previously mixed together with a liquid additive as will be described later.

The compressor 8 compresses an atmospheric air to produce a high-pressure gas, and supplies the high-pressure gas to the pulverizing chamber 20 of the jet mill 4 via the heater 10. The heater 10 has therein a tube in which the high-pressure gas flows. A heating means configured with a filament, an aerofin, or the like is arranged inside the tube. The heating means heats the high-pressure gas flowing inside the tube to a given temperature. Between the compressor 8 and the jet mill 4, other method of dehydration for removing moisture from the high-pressure gas may additionally be provided, or a filter for removing dust or the like may suitably be provided.

The collecting unit 12 captures and collects a finely pulverized powder which is discharged with an air stream from an outlet pipe 30 (see FIG. 2) provided in the middle of the top surface of the jet mill 4 by using a cyclone or a bag filter.

Figure 2:
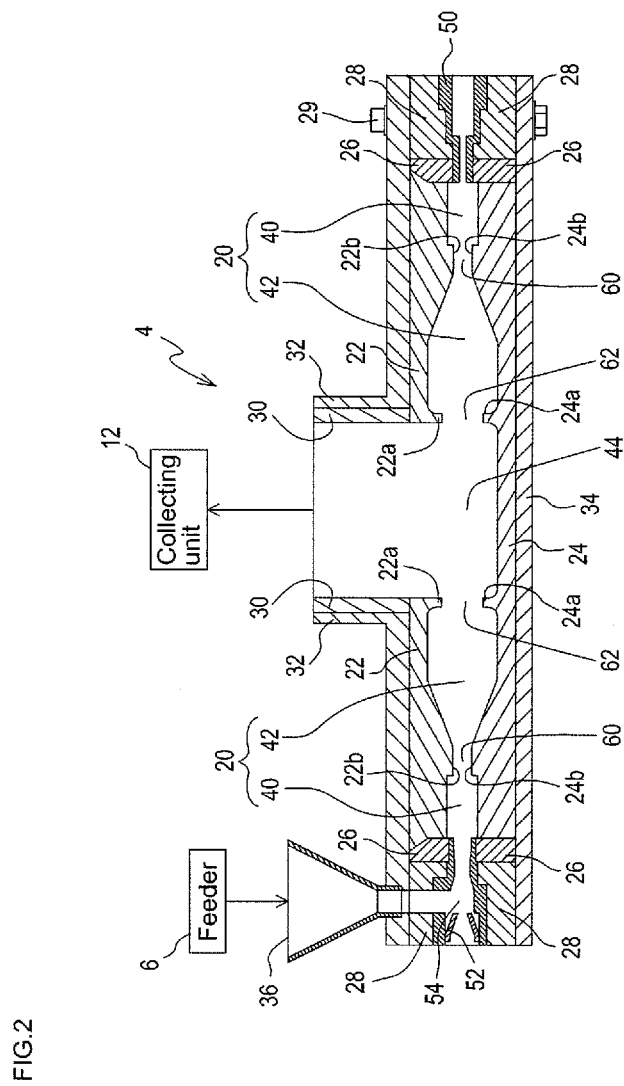
FIG. 2 is a longitudinal cross sectional view illustrating a configuration inside a jet mill according to the embodiment of the present invention.
Figure 3:
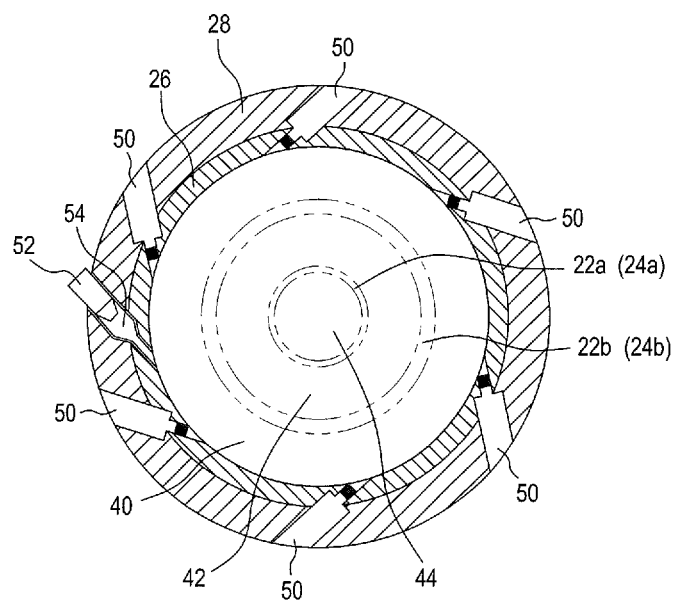
FIG. 3 is a cross sectional view illustrating an arrangement of an air nozzle and a supply nozzle arranged in an outer wall support ring according to the embodiment of the present invention.

The configuration of the jet mill 4 according to the embodiment will be described referring to FIGS. 2 and 3. FIG. 2 is a longitudinal cross sectional view taken along a plane including the center line of the jet mill 4. FIG. 3 is a cross sectional view illustrating an arrangement of an air nozzle and a supply nozzle arranged in an outer wall support ring 28.

As illustrated in FIG. 2, the jet mill 4 includes an upper disk member 22 having a disk shape and a lower disk member 24. The pulverizing chamber 20 is formed between the upper disk member 22 and the lower disk member 24. On outer surfaces of the upper disk member 22 and the lower disk member 24, a pulverizing ring 26 having a cylindrical shape is arranged. Further, the outer wall support ring 28 is arranged to support the pulverizing ring 26 from the outer side thereof. In the middle portion of the top surface of the upper disk member 22, the outlet pipe 30 having a cylindrical shape which is connected to the pulverizing chamber 20 is provided. In the vicinity of the edge of the top surface of the upper disk member 22, the funnel 36 having a conical shape into which a powder transmitted from the feeder 6 is loaded is provided.

On the top surface of the upper disk member 22, an upper support plate 32 which supports the upper disk member 22, the pulverizing ring 26, the outer wall support ring 28, and the outlet pipe 30 from the upper side is provided. On the bottom surface of the lower disk member 24, a lower support plate 34 which supports the lower disk member 24, the pulverizing ring 26, and the outer wall support ring 28 from the bottom side is provided. The upper support plate 32 and the lower support plate 34 are fixed together by a fastening unit 29 in a manner to hold the upper disk member 22, the lower disk member 24, the pulverizing ring 26, and the outer wall support ring 28 therebetween.

The pulverizing chamber 20 is formed as a disk-shaped cavity (internal space) enclosed by the upper disk member 22, the lower disk member 24, and the pulverizing ring 26. The pulverizing chamber 20 is divided into an outer ring-shaped portion which is a pulverization zone 40 and an inner ring-shaped portion which is a classification zone 42. The pulverization zone 40 and the classification zone 42 are connected to each other with a classification ring channel 60. The classification ring channel 60 is a space formed between a ring-shaped classification ring 22b formed on the bottom surface of the upper disk member 22 and a ring-shaped classification ring 24b formed on the upper surface of the lower disk member 24 in the location corresponding to the classification ring 22b.

An outlet space 44 is formed below the outlet pipe 30 of the classification zone 42. The classification zone 42 and the outlet space 44 are connected to each other with an outlet ring channel 62. The outlet ring channel 62 is a space formed between a ring-shaped classification ring 22a formed on the bottom surface of the upper disk member 22 and a ring-shaped classification ring 24a formed on the upper surface of the lower disk member 24 in the location corresponding to the classification ring 22a.

The pulverization zone 40 is a ring-shaped cavity having a constant cavity height along the radial direction. The classification zone 42 is a cavity in which the cavity height gradually increases inward from the end of the cavity, and the cavity height becomes constant from a half way to the center of the jet mill 4. The constant cavity height of the classification zone 42 is larger than the cavity height of the pulverization zone 40.

As illustrated in FIG. 3, six air nozzles 50 are provided in the outer wall support ring 28 at an even interval in the circumferential direction of the outer wall support ring 28, with each of the air nozzles 50 in a position inclined against the tangential line (or center line) of the outer wall of the outer wall support ring 28. The air nozzle 50 ejects a high-pressure gas which is supplied from the compressor 8 and heated by the heater 10. Further, a supply nozzle 52 which ejects a heated air to transmit a powder supplied from the feeder 6 to the inside of the pulverizing chamber 20 is provided in the outer wall support ring 28 with an almost same angle of inclination as that of the air nozzle 50. A diffuser 54 is provided in the front portion of the supply nozzle 52. A powder supplied from the funnel 36 is mixed with an air ejected from the supply nozzle 52 and supplied to the pulverization zone 40 of the pulverizing chamber 20 from the diffuser 54.

The shearing action of the air stream ejected at a high speed from the air nozzle 50 into the pulverizing chamber 20 pulverizes the powder supplied from the supply nozzle 52. Further, since the air stream swirls in the pulverizing chamber 20 at a high speed, the powder supplied from the supply nozzle 52 also swirls at a high speed. Therefore, the powder is pulverized by a mutual collision caused by a swirling motion, and also by colliding with an inner wall surface of the pulverizing chamber 20 (such as the surface of the upper disk member 22, the lower disk member 24, the pulverizing ring 26, the outlet pipe 30, the air nozzle 50, and the tip of the supply nozzle 52).

The upper disk member 22, the lower disk member 24, the pulverizing ring 26, the outlet pipe 30, the air nozzle 50, and the tip of the supply nozzle 52 are made of hard ceramic such as sialon since the powder touching or colliding with the surface thereof is carried by a high-speed air stream.

Figure 4:
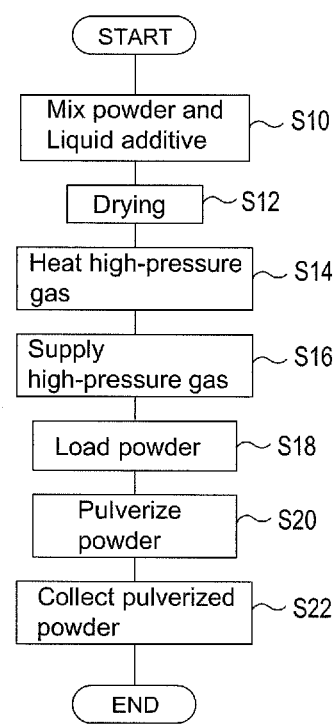
FIG. 4 is a flowchart illustrating a method for manufacturing a powder using the pulverizing apparatus according to the embodiment of the present invention.

The method for manufacturing a powder according to the embodiment will be described referring to the flowchart in FIG. 4. First, a powder to be pulverized and a liquid additive are mixed together (step S10). Then, the liquid additive is vaporized by drying the mixture of the powder and the liquid additive (step S12).

The powder to be classified may be barium titanate or nickel. The liquid additive may be, for example, an alcohol such as ethanol or diethylene glycol monomethyl ether. As for a mixing ratio, when expressed in a normal mass ratio, 0.01 to 0.15, preferably 0.03 to 0.1, of a liquid additive is added to and mixed together with 1 of a powder. When the mixing ratio does not satisfy the range described above, such a problem occurs that the effect of the liquid additive does not appear, or fluidity of the powder significantly decreases.

As for a method of mixing, a stirring using a stirring chip and a magnetic stirrer, a planetary stirrer, a two-axis stirrer, a stirrer using three rolls, or the like may be used. In the embodiment, a mixer (Hi-X, manufactured by Nisshin Engineering Co., Ltd.) is used.

As for a method of drying, natural drying in the room temperature or drying using a thermostat oven may be used. As for a drying condition, such condition may suitably be selected according to a combination of a powder and a liquid additive, particularly, according to a flash point of a liquid additive.

For example, in a case when a powder is barium titanate and a liquid additive is diethylene glycol monomethyl ether (flash point of 93° C.), from a view point of operating efficiency, the drying temperature is typically set to 93 to 200° C., preferably 120 to 200° C. by using a thermostat oven, and the drying time is typically set to two hours or less, preferably 30 minutes to 2 hours. In a case when a liquid additive is ethanol (flash point of 16° C.), from a view point of operating efficiency, the drying temperature is typically set to 16 to 200° C., preferably 120 to 200° C. by using a thermostat oven, and the drying time is typically set to two hours or less, preferably 30 minutes to 2 hours.

When the pulverizing apparatus 2 is operated, a high-pressure gas having a given pressure produced by the compressor 8 is heated to a given temperature by the heater 10 (step S14). The heater 10 heats the high-pressure gas so as the temperature of a swirling air stream which is produced in the pulverizing chamber 20 to be at a desired temperature. The temperature of the swirling air stream in the pulverizing chamber 20 can be estimated by the outlet temperature of the pulverizing chamber 20. For example, when the high-pressure gas is heated to about 150° C. so as the temperature of the swirling air stream which is produced in the pulverizing chamber to be about 140° C., the outlet temperature of the pulverizing chamber 20 is about 95° C.

The high-pressure gas heated to a desired temperature is ejected from the six air nozzles 50 provided in the outer wall support ring 28 and supplied to the pulverizing chamber 20 (step S16). Consequently, a high-speed swirling air stream is produced in the pulverizing chamber.

When a state in which a high-speed swirling air stream heated to a desired degree constantly swirls in the pulverizing chamber 20 is formed as described above, a powder mixed with a liquid additive is transmitted from the feeder 6 at an constant flow rate and loaded into the pulverizing chamber 20 via the funnel 36 and the diffuser 54 (step S18). The powder loaded into the pulverizing chamber 20 from the diffuser 54 is instantly dispersed in the pulverizing chamber 20 by the high-speed swirling air stream. Since the powder and the liquid additive is dried after the mixing thereof, the density of the liquid additive in the pulverizing chamber 20 does not reach a density in which ignition occurs.

The powder loaded into the pulverizing chamber 20 is pulverized into a fine powder (step S20). In the process, the powder is pulverized by the shearing force of the high-speed air stream ejected from the air nozzle 50. Further, the liquid additive existing between fine particles of the powder vaporizes rapidly to facilitate the dispersion of the powder. In this manner, the powder dispersed in an unit of a fine particle swirls in the pulverizing chamber 20 without sticking to the surface of the members constituting the pulverizing chamber 20, such as the upper disk member 22 and the lower disk member 24, and therefore collides with each other and with the inner wall surface of the pulverization zone 40.

Then, the fine powder pulverized into a particle having a given grain size flows in the air stream swirling in the pulverizing chamber 20 and flows into the classification zone 42 of the pulverizing chamber 20 from the pulverization zone 40 by passing through the classification ring channel 60. A powder having a coarse particle stays in the pulverization zone 40 since the centrifugal force, which acts on the particle, created by the swirling motion of the particle flowing in the swirling air stream is large. Therefore, only a fine powder which is pulverized to have a grain size of, or smaller than, a given grain size passes through the classification ring channel 60 to flow into the classification zone 42. The fine powder which has flown into the classification zone 42 flows in the air stream swirling in the classification zone 40 which is better controlled than the air stream swirling in the pulverization zone 42. The fine powder, which is classified so as the grain size thereof to be within a given band of particle size distribution by eliminating a powder having a coarse particle, passes through the outlet ring channel 62 and is discharged from the outlet space 44 via the outlet pipe 30 to be collected in the collecting unit 12 (step S22). All the liquid additives added vaporize, and therefore are not included in the collected powder.

In the method for manufacturing a powder according to the embodiment, a powder to be pulverized which is previously mixed with a liquid additive and dried is loaded into the pulverizing chamber 20 of the jet mill 4, and at the same time, a high-speed swirling air stream having a high temperature is formed in the pulverizing chamber 20 by a heated high-pressure gas. Consequently, the powder is pulverized in a fine particle, and therefore a finely pulverized powder can continuously be obtained.

The embodiment described above includes six air nozzles 50. However, in a case of pulverizing a powder having low adhesiveness, the number of the air nozzle 50 can suitably be selected to be, such as four or two, to increase the energy of the high-pressure gas ejected from each of the air nozzles 50 to efficiently carry out the pulverization of the powder.

EXAMPLES

A method for manufacturing a powder according to an example of the present invention will be described referring to a specific test result described below.

Example 1

A fine powder of barium titanate (particle size distribution by volume standard: $D_{50}$=0.683 μm [median diameter], $D_{100}$=7.778 μm [maximum particle diameter]) is used as a powder to be pulverized. Diethylene glycol monomethyl ether is used as a liquid additive. In the mixing step, diethylene glycol monomethyl ether is added to, and mixed with, the fine powder of barium titanate using a mixer (Hi-X, manufactured by Nisshin Engineering Co., Ltd.). By a mass ratio, 0.05 of diethylene glycol monomethyl ether is added to 1 of barium titanate.

In the drying step, the mixture of barium titanate and diethylene glycol monomethyl ether is dried by ventilation drying at a temperature of 130° C. for two hours in a thermostat oven. The dried mixture is loaded into the jet mill (Super Jet Mill, manufactured by Nisshin Engineering Co., Ltd.).

As for a condition of pulverization in the jet mill, the pressure of the high-pressure gas produced by the compressor 8 illustrated in FIG. 1 is set to 0.7 MPa (flow rate of the compressed air is 0.7 m³/min) and the rate of loading the powder into the jet mill 4 of the pulverizing apparatus 2 is set to 0.3 kg/h. The high-pressure gas is heated so as the outlet temperature to be 95° C.

Comparative Example 1

A fine powder of barium titanate (particle size distribution by volume standard: $D_{50}$=0.683 μm [median diameter], $D_{100}$=7.778 μm [maximum particle diameter]) is loaded into the jet mill (Super Jet Mill, manufactured by Nisshin Engineering Co., Ltd.) without adding and mixing with a liquid additive. The condition of pulverization in the jet mill is similar to Example 1, except that the high-pressure gas is not heated. The outlet temperature is 3° C.

(Method for Estimation)

The product grain size (median diameter and maximum particle diameter) of the fine powder collected in the Example and the Comparative Example is measured. The particle diameter is measured using a measuring instrument for measuring the size of a particle (Microtrac MT-3300EX, manufactured by Nikkiso Co., Ltd.). The measured result is shown in Table 1.

TABLE 1

| | | product grain size | | |
|---|---|---|---|---|
| | outlet temperature | median diameter ($D_{50}$) | maximum particle diameter ($D_{100}$) | finding |
| Example 1 | 95° C. | 0.481 μm | 1.375 μm | able to operate continuously |
| Comparative Example 1 | 3° C. | — | — | clogging occurred within a few tens of seconds in the diffuser, not able to operate |

As shown in Table 1, in the case of Comparative Example 1, a fine powder of barium titanate sticks to the inside of the pulverizing chamber 20 to cause a clogging within a few tens of seconds in the diffuser 54, thereby making the pulverizing apparatus 2 not able to operate.

On the other hand, in the case of Example 1, a powder do not sticks to the inside of the pulverizing chamber 20 and no blockage occurs in the pulverizing chamber 20. The pulverized fine powder has a particle size distribution, by volume standard, of: $D_{50}$=0.481 μm, $D_{100}$=1.375 μm. Thus, it is able to obtain a finely pulverized fine powder of barium titanate continuously.

Consequently, in a case when a fine powder of barium titanate is mixed with diethylene glycol monomethyl ether followed by drying, pulverization of barium titanate can continuously be carried out and a finely pulverized powder can continuously be obtained.

REFERENCE SIGNS LIST

2 . . . pulverizing apparatus, 4 . . . jet mill, 6 . . . feeder, 8 . . . compressor, 10 . . . heater, 12 . . . collecting unit, 20 . . . pulverizing chamber, 22 . . . upper disk member, 24 . . . lower disk member, 40 . . . pulverization zone, 42 . . . classification zone, 50 . . . air nozzle, 52 . . . supply nozzle, 54 . . . diffuser

The invention claimed is:

1. A method for manufacturing a powder comprising:
    a mixing step in which a powder and a liquid additive are mixed together;
    a drying step in which the powder mixed in the mixing step is dried;
    a loading step in which the powder dried in the drying step is loaded into a pulverizer;
    a heating step in which a high-pressure gas is heated;
    a supplying step in which the high-pressure gas heated in the heating step is supplied to the pulverizer; and
    a pulverizing step in which the powder is pulverized by the pulverizer.

2. The method for manufacturing a powder according to claim 1, wherein the liquid additive is diethylene glycol monomethyl ether.

3. The method for manufacturing a powder according to claim 2, wherein the powder is a powder including barium titanate.

4. The method for manufacturing a powder according to claim 3, wherein a drying temperature and a period of time for drying in the drying step correspond to a flash point of the liquid additive.

5. The method for manufacturing a powder according to claim 2, wherein a drying temperature and a period of time for drying in the drying step correspond to a flash point of the liquid additive.

6. The method for manufacturing a powder according to claim 1, wherein the powder is a powder including barium titanate.

7. The method for manufacturing a powder according to claim 6, wherein a drying temperature and a period of time for drying in the drying step correspond to a flash point of the liquid additive.

8. The method for manufacturing a powder according to claim 1, wherein a drying temperature and a period of time for drying in the drying step correspond to a flash point of the liquid additive.

9. A method for manufacturing a powder comprising:
    a mixing step in which a powder and a liquid additive are mixed together;
    a drying step in which the powder mixed in the mixing step is dried;
    a loading step in which the powder dried in the drying step is loaded into a pulverizer;
    a supplying step in which a high-pressure gas is supplied to the pulverizer; and
    a pulverizing step in which the powder is pulverized by the pulverizer.

10. The method for manufacturing a powder according to claim 9, wherein the liquid additive is diethylene glycol monomethyl ether.

11. The method for manufacturing a powder according to claim 10, wherein the powder is a powder including barium titanate.

12. The method for manufacturing a powder according to claim 11, wherein a drying temperature and a period of time for drying in the drying step correspond to a flash point of the liquid additive.

13. The method for manufacturing a powder according to claim 10, wherein a drying temperature and a period of time for drying in the drying step correspond to a flash point of the liquid additive.

14. The method for manufacturing a powder according to claim 9, wherein the powder is a powder including barium titanate.

15. The method for manufacturing a powder according to claim 14, wherein a drying temperature and a period of time for drying in the drying step correspond to a flash point of the liquid additive.

16. The method for manufacturing a powder according to claim 9, wherein a drying temperature and a period of time for drying in the drying step correspond to a flash point of the liquid additive.

* * * * *